(12) United States Patent
Belzile

(10) Patent No.: US 8,870,563 B2
(45) Date of Patent: Oct. 28, 2014

(54) PLASTICATING AND INJECTION DEVICE

(75) Inventor: Manon Danielle Belzile, Fairfield, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 14/004,217

(22) PCT Filed: Mar. 8, 2012

(86) PCT No.: PCT/US2012/028152
§ 371 (c)(1),
(2), (4) Date: Sep. 10, 2013

(87) PCT Pub. No.: WO2012/125380
PCT Pub. Date: Sep. 20, 2012

(65) Prior Publication Data
US 2013/0344188 A1 Dec. 26, 2013

Related U.S. Application Data

(60) Provisional application No. 61/452,087, filed on Mar. 12, 2011.

(51) Int. Cl.
*B29C 45/72* (2006.01)
*B29C 47/54* (2006.01)
B29C 45/53 (2006.01)
B29C 45/54 (2006.01)

(52) U.S. Cl.
CPC ............... *B29C 45/53* (2013.01); *B29C 45/531* (2013.01); *B29C 45/542* (2013.01); *B29C 45/532* (2013.01); *B29C 45/544* (2013.01); *B29C 45/535* (2013.01); *B29C 47/54* (2013.01); *B29C 45/541* (2013.01)
USPC ....... 425/559; 366/76.7; 366/176.3; 366/341; 425/547; 425/557; 425/562

(58) Field of Classification Search
CPC .... B29C 45/53; B29C 45/531; B29C 45/532; B29C 45/535; B29C 45/541; B29C 45/542; B29C 45/544
USPC .......................... 425/547, 557, 559, 562, 564; 366/176.1, 176.3, 69, 341, 76.7, 100
See application file for complete search history.

(56) References Cited

U.S. PATENT DOCUMENTS

| 2,585,112 A | 2/1952 | Gravesen |
| 2,798,256 A | 7/1957 | Eynard |

(Continued)

FOREIGN PATENT DOCUMENTS

| FR | 2246377 | * | 2/1973 | |
| GB | 000635991 A | * | 4/1950 | ............. B29C 45/53 |

(Continued)

*Primary Examiner* — Yogendra Gupta
*Assistant Examiner* — Emmanuel S Luk

(57) ABSTRACT

Plasticizing system for plasticizing solidified-resin particle, plasticizing system, comprising: housing assembly providing: (i) melt channel configured to receive solidified-resin particle, and (ii) opposite-facing surfaces spaced apart from each other, and defining, at least in part, convergene channel configured to receive the solidified-resin particle. Opposite-facing surfaces and the convergence channel form part of melt channel. Plunger assembly is movable, at least in part, relative to opposite-facing surfaces. Plunger assembly configured to move, at least in part, solidified-resin particle relative to opposite-facing surfaces along, at least in part, convergence channel. In response to relative movement between solidified-resin particle and opposite-facing surfaces, solidified-resin particle receives, in use, plasticization-inducing effect from opposite-facing surfaces. The plasticization-inducing effect is configured to platicize solidified-resin particle into flowable melt and injected into a mold assembly (850).

10 Claims, 8 Drawing Sheets

(56) References Cited

U.S. PATENT DOCUMENTS

| | | | |
|---|---|---|---|
| 2,862,240 A * | 12/1958 | Strauss | 222/638 |
| 2,872,705 A | 2/1959 | Labarre | |
| 3,508,298 A * | 4/1970 | Seidl | 425/199 |
| 3,695,575 A | 10/1972 | Hauser | |
| 3,837,536 A | 9/1974 | Hauser | |
| 3,989,793 A | 11/1976 | Hertel et al. | |
| 4,333,608 A | 6/1982 | Hendry | |
| 4,334,847 A * | 6/1982 | Schauffele | 425/227 |
| 5,059,113 A * | 10/1991 | Ito et al. | 425/564 |
| 5,123,833 A | 6/1992 | Parker | |
| 5,773,042 A * | 6/1998 | Amano et al. | 425/207 |
| 5,798,128 A * | 8/1998 | Dumazet et al. | 425/147 |
| 6,267,580 B1 * | 7/2001 | Leopold et al. | 425/557 |
| 7,014,454 B2 * | 3/2006 | Eichlseder | 425/557 |
| 7,029,257 B2 * | 4/2006 | Lee et al. | 425/116 |
| 7,077,642 B2 * | 7/2006 | Smith | 425/558 |
| 7,175,419 B2 | 2/2007 | Babin | |
| 7,387,509 B2 * | 6/2008 | Nishizawa | 425/557 |
| 7,399,178 B2 * | 7/2008 | Shinoda et al. | 425/557 |
| 2003/0228389 A1 * | 12/2003 | Itoh | 425/546 |
| 2006/0003038 A1 * | 1/2006 | Serniuck | 425/130 |
| 2006/0043640 A1 * | 3/2006 | Mahmood et al. | 264/272.17 |
| 2006/0121154 A1 * | 6/2006 | Manning | 425/564 |
| 2009/0108500 A1 * | 4/2009 | Jenko | 264/328.19 |
| 2009/0274790 A1 | 11/2009 | Jenko et al. | |
| 2012/0107445 A1 * | 5/2012 | Murasugi et al. | 425/551 |

FOREIGN PATENT DOCUMENTS

| | | | | |
|---|---|---|---|---|
| JP | 2008284759 | * | 11/2008 | B29C 45/53 |
| WO | WO2013153333 A1 | * | 10/2013 | B29C 45/535 |

* cited by examiner

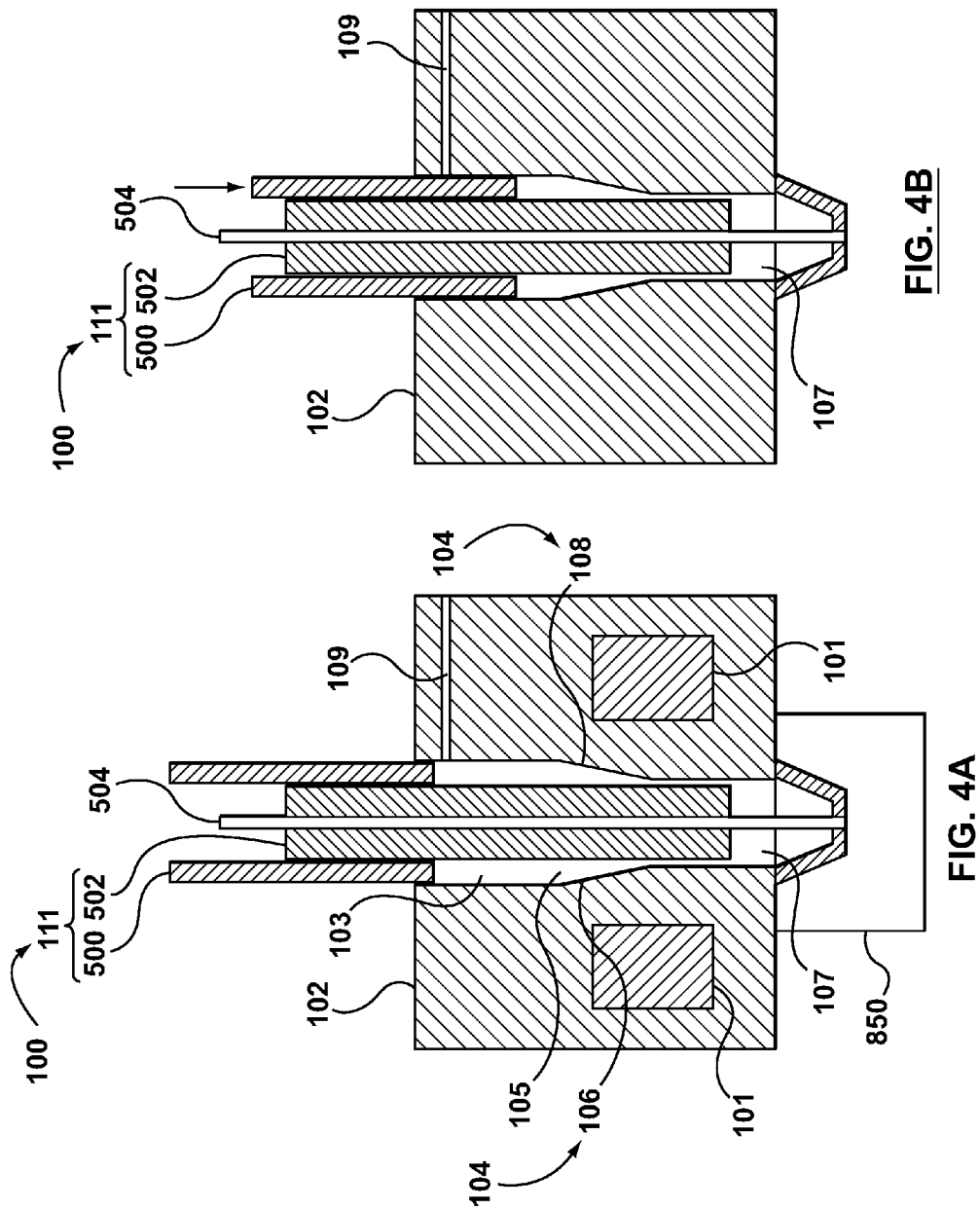

PLASTICATING AND INJECTION DEVICE

TECHNICAL FIELD

An aspect generally relates to (but is not limited to) a plasticating and injection device.

SUMMARY

The inventors have researched a problem associated with known molding systems that inadvertently manufacture bad-quality molded articles or parts. After much study, the inventors believe they have arrived at an understanding of the problem and its solution, which are stated below, and the inventors believe this understanding is not known to the public.

According to one aspect, there is provided a plasticizing system (100) for plasticizing a solidified-resin particle (202), the plasticizing system (100), comprising: a housing assembly (102) providing: (i) a melt channel (103) being configured to receive the solidified-resin particle (202), and (ii) opposite-facing surfaces (104) being spaced apart from each other, and defining, at least in part, a convergence channel (105) being configured to receive the solidified-resin particle (202), the opposite-facing surfaces (104) and the convergence channel (105) forming part of the melt channel (103); and a plunger assembly (111) being movable, at least in part, relative to the opposite-facing surfaces (104), the plunger assembly (111) being configured to move, at least in part, the solidified-resin particle (202) relative to the opposite-facing surfaces (104) along, at least in part, the convergence channel (105), and in response to relative movement between the solidified-resin particle (202) and the opposite-facing surfaces (104), the solidified-resin particle (202) receives, in use, a plasticization-inducing effect from the opposite-facing surfaces (104), and the plasticization-inducing effect is configured to plasticize the solidified-resin particle (202) into a flowable melt to fill the cavity of the mold assembly (850).

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description of the non-limiting embodiments when taken in conjunction with the accompanying drawings, in which:

FIGS. 1, 3A, 3B, 4A, 4B, 4C, 4D, 4E, 5A, 5B, 6 depict schematic representations of a plasticizing system (100).

The drawings are not necessarily to scale and may be illustrated by phantom lines, to diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

FIGS. 1, 3A, 3B, 4A, 4B, 4C, 4D, 4E, 5A, 5B, 6 depict the schematic representations of the plasticizing system (100). The plasticizing system (100) may include some components that are known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" $3^{rd}$ Edition authored by JOHANNABER (ISBN 3-446-17733-7) and/or (iv) "*Runner and Gating Design Handbook*" authored by BEAUMONT (ISBN 1-446-22672-9). It will be appreciated that for the purposes of this document, the phrase "includes (but is not limited to)" is equivalent to the word "comprising". The word "comprising" is a transitional phrase or word that links the preamble of a patent claim to the specific elements set forth in the claim which define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim.

Figure 1:
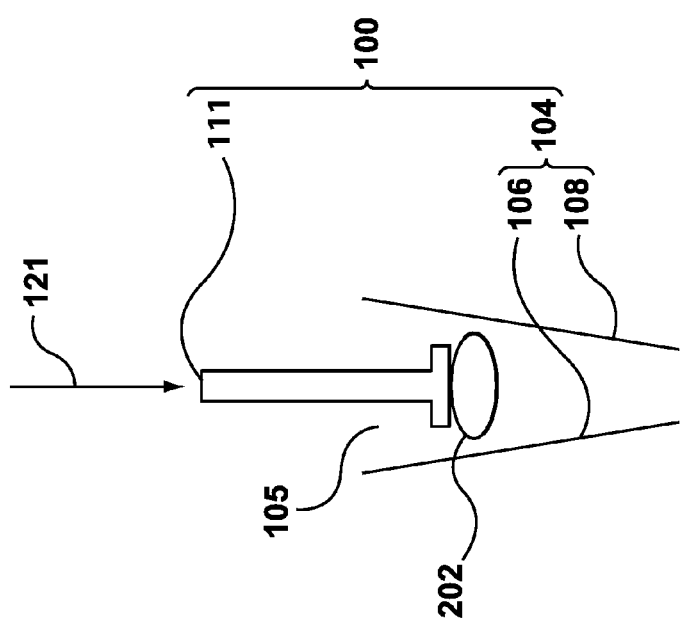

Referring now to the FIGS., and specifically now to FIG. 1, in which there is depicted an example of the plasticizing system (100) for plasticizing a solidified-resin particle (202). The plasticizing system (100) includes (by way of example and not limited to): (i) opposite-facing surfaces (104), and (ii) a plunger assembly (111). The opposite-facing surfaces (104) are spaced apart from each other. The opposite-facing surfaces (104) define, at least in part, a convergence channel (105). The convergence channel (105) is configured to receive the solidified-resin particle (202). The plunger assembly (111) is movable, at least in part, relative to the opposite-facing surfaces (104). The plunger assembly (111) is configured to move, at least in part, the solidified-resin particle (202) relative to the opposite-facing surfaces (104) along, at least in part, the convergence channel (105). The solidified-resin particle (202) may include (by way of example and not limited to): a particle, a pellet, a particle of a powder, a flake, and/or a fiber. The thickness of the solidified-resin particle (202) may be defined as a height or a width of the solidified-resin particle (202) above a planar surface supporting the solidified-resin particle (202).

The opposite-facing surfaces (104) may be separated by a width varying from greater than the width of the solidified-resin particle (202) to less than the width of the solidified-resin particle (202).

Figure 2:
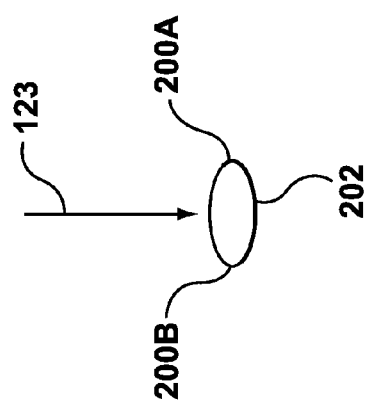
FIG. 2 shows a solidified resin particle in isolation.

Referring now to FIGS. 1 and 2, the opposite-facing surfaces (104) may be configured to contact, in use, opposite sides (200A; 200B) of the solidified-resin particle (202). The opposite sides (200A; 200B) of the solidified-resin particle (202) are depicted in FIG. 2. More specifically, the opposite-facing surfaces (104) may include (by way of example and not limited to): (i) a first surface (106), and (ii) a second surface (108) that is set apart from and facing the first surface (106). The first surface (106) and the second surface (108) may be configured to contact, in use, the solidified-resin particle (202). The solidified-resin particle (202) may be pre-heated before being made to move relative to the opposite-facing surfaces (104). The solidified-resin particle (202) may be dried before being made to move relative to the opposite-facing surfaces (104). At least one of the opposite-facing surfaces (104) is configured to contact, in use and at least in part, opposite sides (200A; 200B) of the solidified-resin particle (202).

The convergence channel (105) may vary from greater than the width of the solidified-resin particle (202) to less than the width of the solidified-resin particle (202). The plunger assembly (111) may be configured to: (i) linearly move in accordance to a predetermined speed profile, (ii) transmit, in use, a linearly-applied force (123) to the solidified-resin particle (202), and (iii) move the solidified-resin particle (202) relative to the opposite-facing surfaces (104). A direction (121) indicates the direction in which the plunger assembly (111) moves.

In response to relative movement between the solidified-resin particle (202) and the opposite-facing surfaces (104), the solidified-resin particle (202) may receive, in use, a plasticization-inducing effect from the opposite-facing surfaces (104). The plasticization-inducing effect may be configured to plasticize the solidified-resin particle (202) into a flowable melt. The plasticization-inducing effect may include (and is not limited to): a cooperative combination of: (i) heat energy, (ii) a drag force, and (iii) a compression force. An angle of the convergence channel (105) may provide a ratio between the drag force and the compression force applied, in use, to the solidified-resin particle (202). In this embodiment, the plunger also pressurizes the melt to fill a mold cavity of a mold assembly (850), which is depicted in FIG. 3B.

Figure 3A:
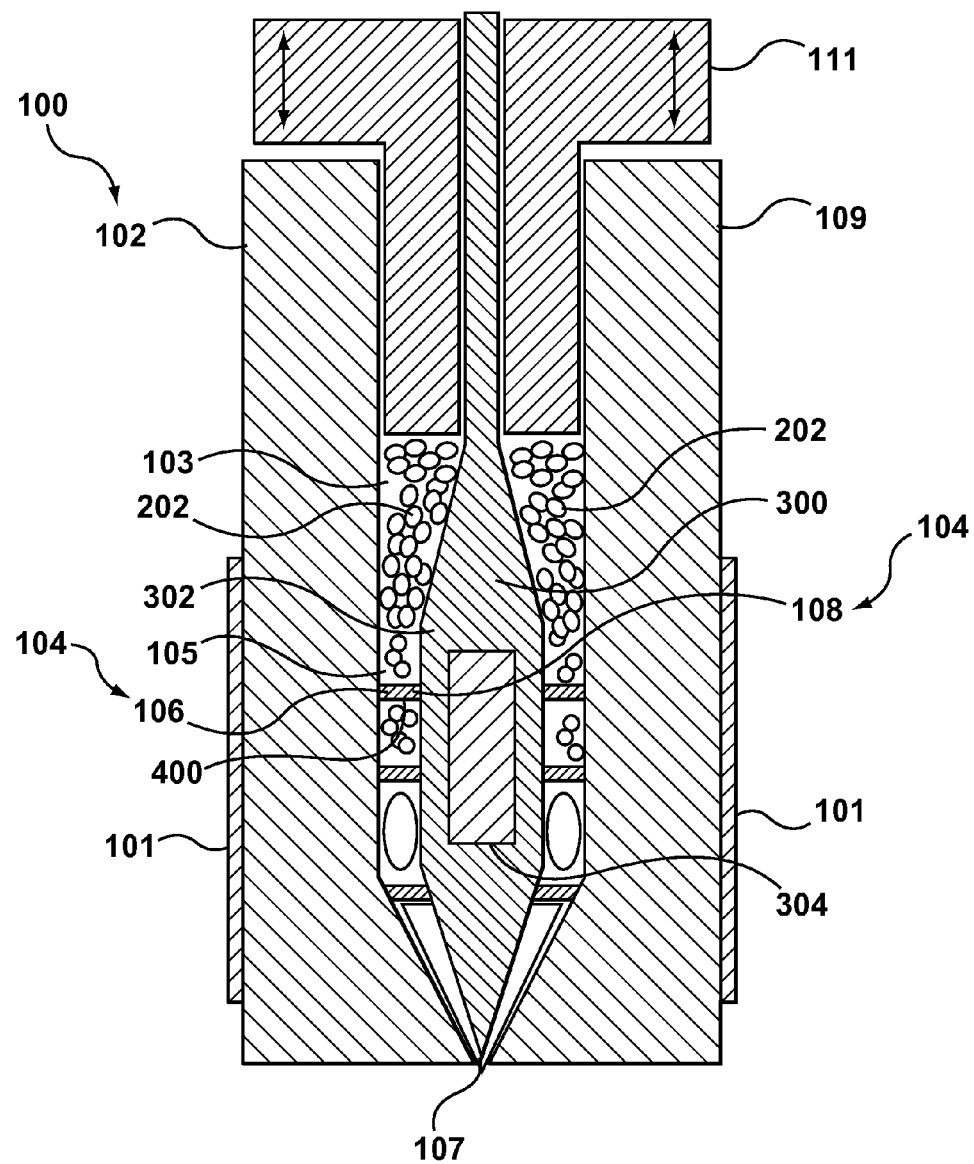
Figure 3B:
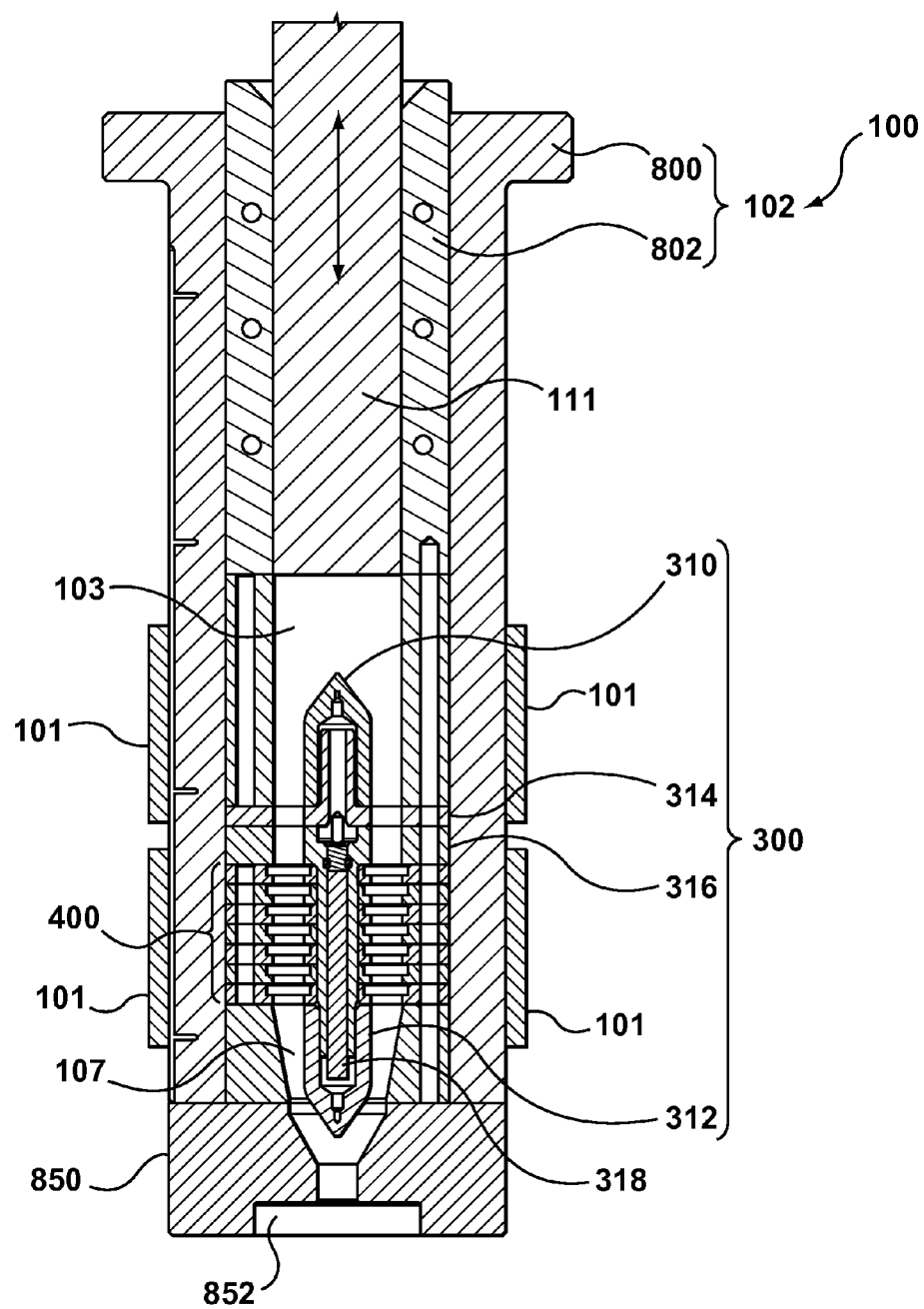

Referring now to FIGS. 3A and 3B, the plasticizing system (100) may include (by way of example and is not limited to) a housing assembly (102). The housing assembly (102) may provide: (i) a melt channel (103) configured to receive the solidified-resin particle (202), and (ii) the opposite-facing surfaces (104) being spaced apart from each other, and defining, at least in part, the convergence channel (105) configured to receive the solidified-resin particle (202). Example of the first surface (106) and the second surface (108) are depicted in FIG. 3A.

The opposite-facing surfaces (104) and the convergence channel (105) may form part of the melt channel (103). The plunger assembly (111) may be movable, at least in part, relative to the opposite-facing surfaces (104). The plunger assembly (111) may be configured to move, at least in part, the solidified-resin particle (202) relative to the opposite-facing surfaces (104) along, at least in part, the convergence channel (105). In response to relative movement between the solidified-resin particle (202) and the opposite-facing surfaces (104), the solidified-resin particle (202) receives, in use, the plasticization-inducing effect from the opposite-facing surfaces (104). The plasticization-inducing effect is configured to plasticize the solidified-resin particle (202) into a flowable melt.

By way of example, the plunger assembly (111) may be configured to move the solidified-resin particle (202) toward an injection tip (107) of the housing assembly (102). The plunger assembly (111) may be configured to eject the flowable melt from the injection tip (107) of the housing assembly (102).

According to an option, the plasticizing system (100) may further include (by way of example and not limited to) a mesh assembly (400) positioned in the melt channel (103) of the housing assembly (102). The mesh assembly (400) may provide the opposite-facing surfaces (104). The mesh assembly (400) may be one or many mesh portions that may be stacked or layered with a mesh like material. In accordance with an option, the mesh assembly (400) may include (and is not limited to): a solid plate defining openings that extends from one side to the other of the solid plate, and the openings may provide a viscous drag effect to skin the outside molten layer of the pellet. The stacks of mesh like materials may have the same or may have different mesh sizes and thicknesses. The mesh assembly (400) may be configured to provide a viscous drag (that is, pellet skinning) and to homogenize the melt.

According to the examples of FIGS. 3A and 3B, the plunger assembly (111) permits simultaneous melting of the solidified-resin particle (202) and injection of the melt or resin. It will be appreciated that the example depicts a thermal gate. It will be appreciated that a valve gate (not depicted) may be used as an alternative to the thermal gate. The plasticating action may occur when the solidified-resin particles (202) are forced between the torpedo assembly (302) and the externally heated wall of the housing assembly (102). The mesh assembly (400), such as mesh discs, may be introduced near a tip of the torpedo assembly (302) to promote mixing, for example, when a colorant is added to the solidified-resin particle (202), and/or to homogenize the melt.

According to another option, the plasticizing system (100) may be arranged such that the opposite-facing surfaces (104) are provided by: (i) a wall of the melt channel (103) of the housing assembly (102), and (ii) an outer wall of a stationary assembly (300) located inside the melt channel (103) of the housing assembly (102). The opposite-facing surfaces (104) may be configured to contact, in use and at least in part, opposite sides (200A; 200B) of the solidified-resin particle (202).

Referring to FIG. 3A, the stationary assembly (300) may include (and is not limited to by way of example): a torpedo assembly (302) positioned in the melt channel (103). The torpedo assembly (302) may include a torpedo heater (304). The housing assembly (102) may include, by way of example and not limited to, a heater assembly (101) that may be configured to provide heat to the housing assembly (102). The housing assembly (102) may also provide a pellet inlet (109) that leads to the melt channel (103).

Referring to the example depicted in FIG. 3B, the housing assembly (102) may include (by way of example and is not limited to): an external housing (800), and an internal housing (802) received in the external housing (800). The stationary assembly (300) may include: (i) a first stationary pin (310) that extends along the melt channel (103) away from the injection tip (107), (ii) a second stationary pin (312) that extends towards the injection tip (107), (iii) a first pin holder (314) that is connected to the housing assembly (102), the first pin holder (314) configured to hold the first stationary pin (310) in position, and (iv) a second pin holder (316) that is connected to the housing assembly (102), the second pin holder (316) to configured to hold the second stationary pin (312) in position. A pin heater assembly (318) may be mounted or supported by the stationary assembly (300). The injection tip (107) may be in fluid communication (in use) with a mold assembly (850). The mold assembly (850) may include a runner system. The mold assembly (850) may define at least one or more mold cavities (852).

Referring now to FIGS. 4A to 4E, the plasticizing system (100) may be adapted or arranged such that the plunger assembly (111) includes: (i) a melting-plunger assembly (500), and (ii) an injection-plunger assembly (502). The melting-plunger assembly (500) may be movable, at least in part, relative to the opposite-facing surfaces (104). Once again, examples of the first surface (106) and the second surface (108) are depicted. The melting-plunger assembly (500) may be configured to move, at least in part, the solidified-resin particle (202) relative to the opposite-facing surfaces (104) along, at least in part, the convergence channel (105). The melting-plunger assembly (500) may be configured to move the solidified-resin particle (202) toward the injection tip (107) of the housing assembly (102). The injection-plunger assembly (502) may be slidably movable along the melt channel (103) toward the injection tip (107) of the housing assembly (102). The injection-plunger assembly (502) may be configured to inject the flowable melt from the injection tip (107) of the housing assembly (102) toward the mold assembly (850).

Figure 4C:
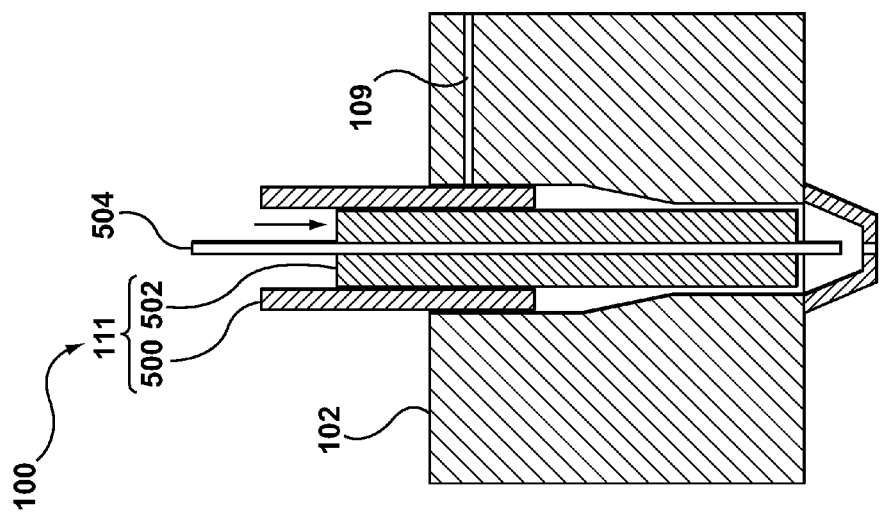
Figure 4D:
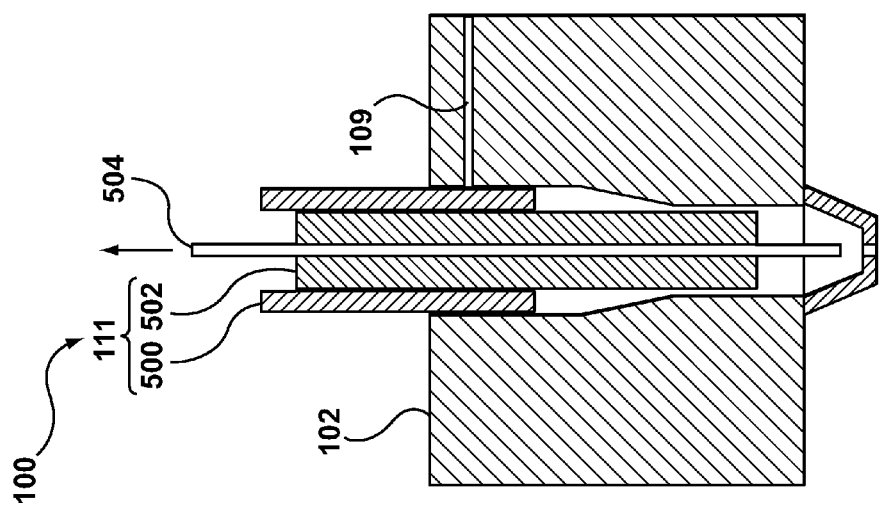
Figure 4E:
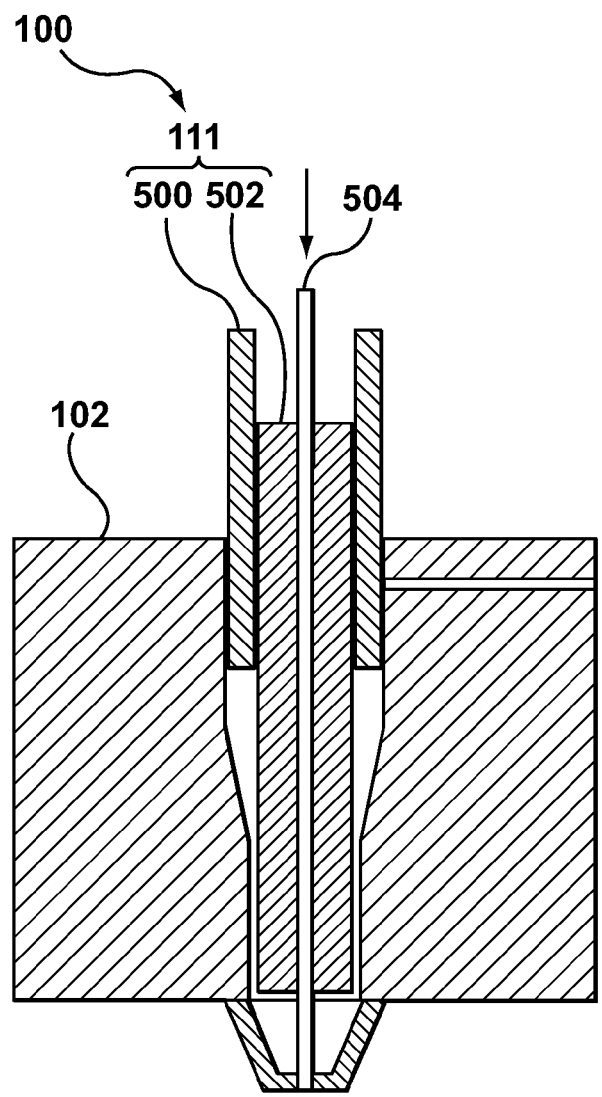

In FIG. 4A, the solidified-resin particle (202) may be introduced into the pellet inlet (109), which then enters into the melt channel (103). In FIG. 4B, the melting-plunger assembly (500) is translated toward the injection tip (107), so that the pellets may be converted into the resin. In FIG. 4C, the shut-off assembly (504) is translated away from the injection tip (107), so that the injection tip (107) changes from a closed state to an open state so that the injection tip (107) is in fluid communication with the mold assembly (850). In FIG. 4D, the injection-plunger assembly (502) is translated toward the injection tip (107), so that the resin may be injected out from injection tip (107) and into the mold assembly (850). In FIG. 4E, the shut-off assembly (504) is translated toward the injection tip (107), so that the injection tip (107) changes from the open state to the closed state so that the injection tip (107) is no longer in fluid communication with the mold assembly (850), thereby stopping the flow of the resin into the mold assembly (850). The resin may be solidified in the mold assembly (850). The process may be repeated as often as required.

According to an option, the plasticizing system (100) may be adapted such that the melting-plunger assembly (500) and the injection-plunger assembly (502) may be coaxially positioned relative to each other; it will be appreciated that other arrangements may be possible, such as the melting-plunger assembly (500) and the injection-plunger assembly (502) may be positioned perpendicular to each other, or side by side, or opposite to each other.

According to another option, the plasticizing system (100) may further include (by way of example and is not limited to) a shut-off assembly (504). The shut-off assembly (504) may be coaxially movable along the injection-plunger assembly (502). The shut-off assembly (504) may be configured to selectively shut off and turn on a flow of a melted resin at the injection tip (107) of the housing assembly (102). As well, the shut-off assembly (504) may be coaxially movable along the injection-plunger assembly (502). It will be appreciated that the shut-off assembly (504) may include for example a movable pin that is coaxially movable along the central portion or central axis of the injection-plunger assembly (502).

According to another option, the plasticizing system (100) may further include (and is not limited to) a heater assembly (101). The heater assembly (101) may be configured to: (i) be positioned relative to the housing assembly (102), and (ii) apply, in use, heat to the resin material located in the housing assembly (102). The heater assembly (101) may be mounted to the housing assembly (102) or to the injection-plunger assembly (502). The heater assembly (101) may provide, in use, thermal energy to a converging transition portion of the melt channel (103) of the housing assembly (102). The melt channel (103) extends from the pellet inlet (109) to the injection tip (107) of the housing assembly (102).

Generally referring once again to FIGS. 4A to 4E, the solidified-resin particle (202) may be introduced to a metering section of the housing assembly (102), which may be formed by an outer diameter of the injection-plunger assembly (502) and an inner diameter of the housing assembly (102). The melting-plunger assembly (500) may be annular. A stroke may drive an amount of melted resin that may fill an injection section of the housing assembly (102). The injection-plunger assembly (502) may also guide the shut-off assembly (504) to open and close a gate that leads to the mold assembly (850). The melt may be created by heat conduction, drag and compression forces caused by actuating the melting-plunger assembly (500) and forcing the solidified-resin particle (202) through a converging annular channel formed between the housing assembly (102) and the injection-plunger assembly (502). During a melting stroke, the injection-plunger assembly (502) may be retracted to an adjustable stop defining a shot size. The shut-off assembly (504), which is depicted as a valve stem by way of example, may be in a closed position to prevent the melt from drooling in the cavity of the mold assembly (850). Once a desired shot size has been reached, the shut-off assembly (504) may be opened and the injection-plunger assembly (502) may be actuated. The melting-plunger assembly (500) may be retracted and the solidified-resin particle (202) may be conveyed into a melting zone of the housing assembly (102) during this time. An advantage of this arrangement may be that the melt may be produced just before the melt is injected and precisely metered in a first in first out (FIFO) manner and therefore, waste and variability associated with transporting the melt over long distances may be reduced. Another advantage may be that there is a reduction in wasted energy to maintain melt temperature, since the melt may be injected immediately into the mold cavity. It may be also more energy efficient to convey the solidified-resin particle (202) to multiple cavities in the mold assembly (850), rather than distribute and maintain melt homogeneity and balance. Another possible advantage may be that any leakage from the injection-plunger assembly (502) may be pushed back into an injection section of the housing assembly (102) with the next melting cycle. Another advantage may be that since the volume of the resin between the injection-plunger assembly (502) and the mold cavity may be reduced to a minimum, detrimental effects due to compressibility of the resin (such as cycle time lags) may be minimized.

Figure 5A:
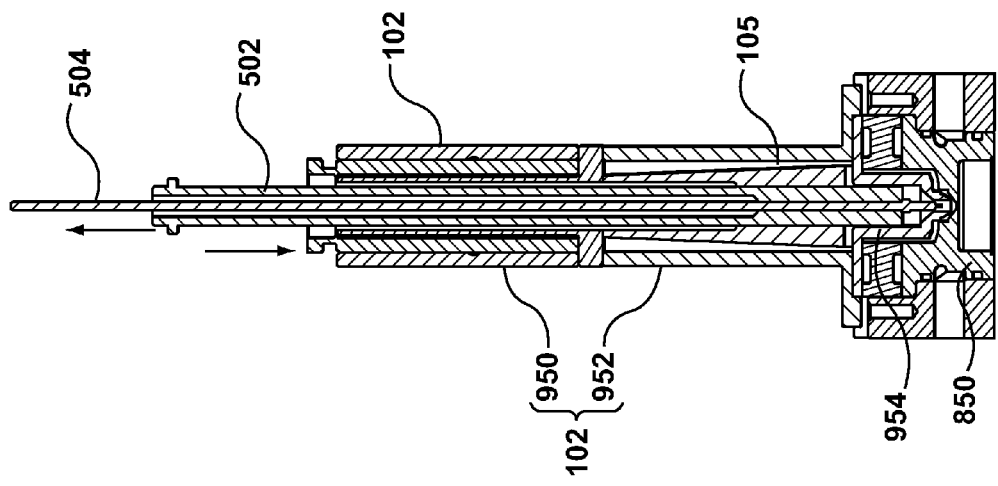
Figure 5B:
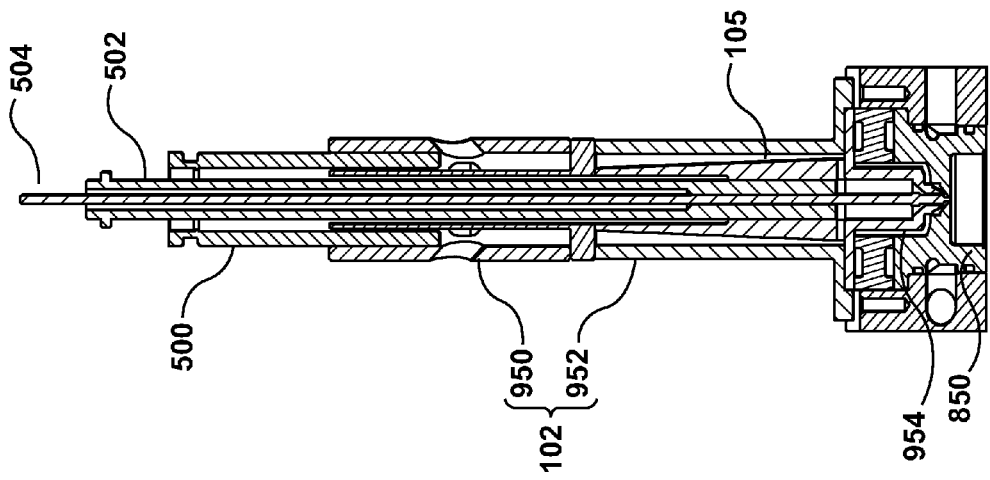

FIGS. 5A and 5B depict another example. FIG. 5A depicts the arrangement in which a melting operation may occur. FIG. 5B depicts the arrangement in which an injecting operation may occur. A sequence of operation includes (and is not limited to): (i) the shut-off assembly (504) is opened (that is, the shut-off assembly (504) is retracted), (ii) the injection-plunger assembly (502) is moved forward, (iii) the injection-plunger assembly (502) is on hold or is held in position, (iv) the shut-off assembly (504) is closed (that is the shut-off assembly (504) is moved to close and prevent flow of the resin into the mold assembly (850), (v) the melting-plunger assembly (500) is retracted, (vi) the pellets or solidified resin particles are fed to the housing assembly (102), (vii) the injection-plunger assembly (502) is retracted, (viii) the melting-plunger assembly (500) is moved forward pushing the melted resin in front of the injection-plunger assembly (502), thus building the next shot to be injected into the mold cavity.

Figure 6:
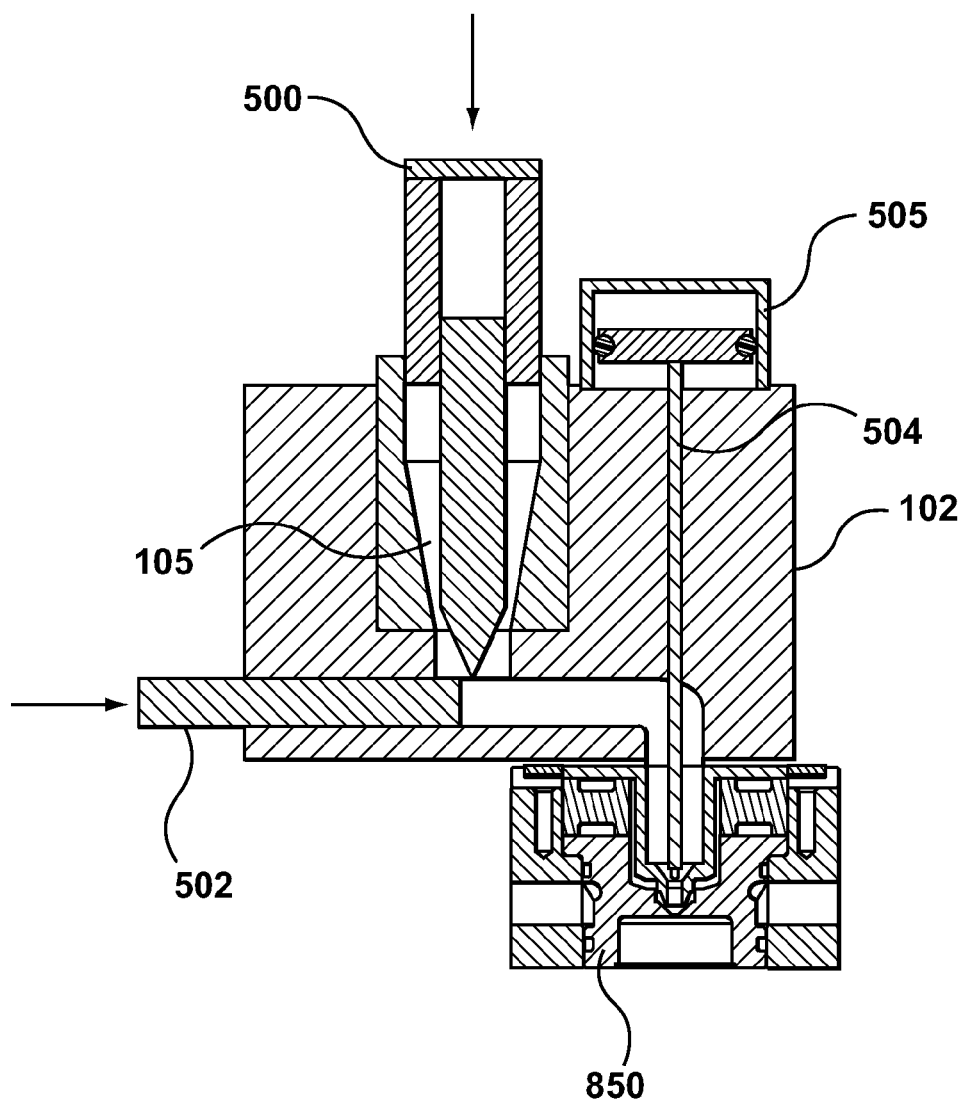

FIG. 6 depicts another example embodiment, in which the melting-plunger assembly (500) and the injection-plunger assembly (502) are not aligned coaxial relative to each other. The melting-plunger assembly (500) and the injection-plunger assembly (502) may be arranged to be positioned perpendicular to each other. More specifically, FIG. 6 depicts a perpendicular arrangement between the melting-plunger assembly (500) and the injection-plunger assembly (502). The housing assembly (102) may receive the melting-plunger assembly (500). The convergence channel (105) is provided by the housing assembly (102) in the melt channel that receives the melting-plunger assembly (500). The melting-plunger assembly (500) is in fluid communication with a melt channel that leads to a tip of the shut-off assembly (504). The housing assembly (102) also supports a stem actuator (505) that may be attached to the shut-off assembly (504). The injection-plunger assembly (502) is aligned perpendicular relative to the melting-plunger assembly (500), and the injection-plunger assembly (502) acts on the melt channel defined by the housing assembly (102). The melting-plunger assembly (500) moves resin into the melt channel of the housing assembly (102). While the melting-plunger assembly (500) is held in steady position, the injection-plunger assembly (502) moves the resin through the melt channel of the housing assembly (102) toward the outlet where the shut-off assembly (504) has been retracted so as to permit exit of the resin from the melt channel of the housing assembly (102), so the resin may flow into the mold assembly (850).

It will be appreciated that the assemblies and modules described above may be connected with each other as may be required to perform desired functions and tasks that are within the scope of persons of skill in the art to make such combinations and permutations without having to describe each and every one of them in explicit terms. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is noted that the foregoing has outlined the non-limiting embodiments (examples). The description is made for particular non-limiting embodiments (examples). It is understood that the non-limiting embodiments are merely illustrative as examples.

What is claimed is:

1. A plasticizing system for plasticizing a solidified-resin particle, the plasticizing system, comprising:
    a housing assembly providing:
        (i) a melt channel configured to receive the solidified-resin particle, and
        (ii) opposite-facing surfaces provided by:
            a wall of the melt channel of the housing assembly, and
            an outer wall of a stationary assembly located inside the melt channel of the housing assembly,
        the opposite-facing surfaces configured to contact, in use and at part, opposite sides of the solidified resin particle, and spaced apart from each other, and defining, at least in part, a convergence channel configured to receive the solidified-resin particle, the opposite-facing surfaces and the convergence channel forming part of the melt channel;
    a mesh assembly positioned in the melt channel, the mesh assembly extending between the opposite-facing surfaces; and
    a plunger assembly movable, at least in part, relative to the opposite-facing surfaces the plunger assembly, configured to move, at least in part, the solidified-resin particle relative to the opposite-facing surfaces along, at least in part, the convergence channel, and in response to relative movement between the solidified-resin particle and the opposite-facing surfaces, the solidified-resin particle receives, in use, a plasticization-inducing effect from the opposite-facing surfaces, and the plasticization-inducing effect is configured to plasticize the solidified-resin particle into a flowable melt injected into a mold assembly.

2. The plasticizing system of claim 1, wherein:
    the plunger assembly is configured to move the solidified-resin particle toward an injection tip of the housing assembly,
    the plunger assembly is configured to inject the flowable melt from the injection tip of the housing assembly.

3. The plasticizing system of claim 1, wherein the mesh assembly includes a plurality of stacked or layered mesh portions.

4. The plasticizing system of claim 1, wherein the mesh assembly includes a plate defining openings.

5. The plasticizing system of claim 1, wherein the stationary assembly includes a torpedo assembly.

6. The plasticizing system of claim 5, wherein the torpedo assembly includes a torpedo heater.

7. The plasticizing system of claim 1, wherein the housing assembly includes a heater assembly.

8. The plasticizing system of claim 2, wherein the housing assembly includes an external housing and an internal housing received in the external housing.

9. The plasticizing system of claim 2 or 8, wherein the stationary assembly includes:
    a first stationary pin that extends along the melt channel away from the injection tip;
    a second stationary pin that extends along the melt channel towards the injection tip;
    a first pin holder connected to the housing assembly for holding the first stationary pin in position; and
    a second pin holder connected to the housing assembly for holding the second stationary pin in position.

10. The plasticizing system of claim 9, further comprising a pin heater assembly mounted to the stationary assembly.

* * * * *